2,957,206
Patented Oct. 25, 1960

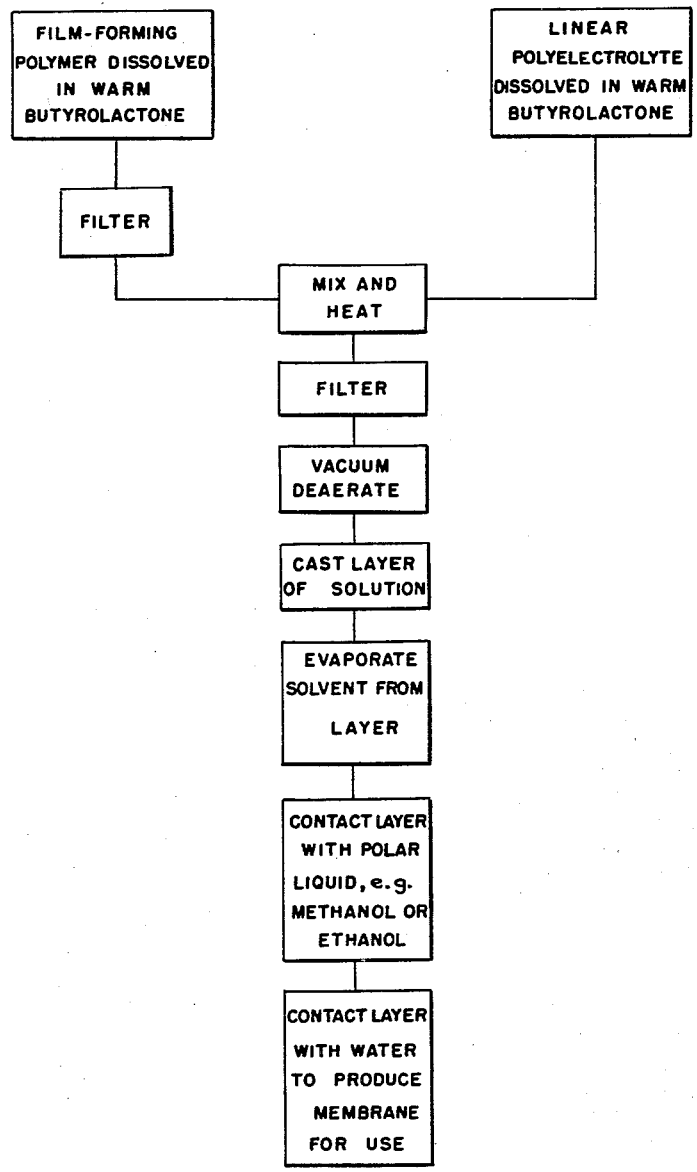

2,957,206

PRODUCTION OF ION SELECTIVE PERMEABLE MEMBRANE AND COMPOSITION THEREFOR

Morris Mindick and Harold I. Patzelt, Chicago, Ill., assignors to Nalco Chemical Company, a corporation of Delaware Filed July 22, 1957, Ser. No. 673,105

23 Claims. (Cl. 18—57)

This invention relates to the production of ion selective permeable membranes and to compositions useful for casting articles having ion exchange properties, particularly, ion exchange membranes or the like. More particularly, the invention relates to electronegative and electropositive ion selective barriers having high permselectivities and low ohmic resistances.

In patent application Serial No. 511,062, filed May 25, 1955, and in patent application Serial No. 513,944, filed June 8, 1955, both by Gregor and Patzelt, and assigned to applicants' assignee, new and very useful electronegative and electropositive selective permeable membranes having high permselectivities and low ohmic rsistances are described. The present invention relates to improvements in the production of such membranes which provide considerable advantages in the commercial production of the membranes.

The present invention is concerned with the discovery that a number of advantages are obtained by forming the membranes from a butyrolactone solution of the polymers which compose the membranes. The invention also provides a new composition of a butyrolactone solution of the polymers which is useful for producing the membranes as well as other articles having ion exchange properties.

It has been discovered that the production of the membranes from a butyrolactone solution of the polymers results in improved electrochemical properties. The permselectivities are high and the resistances are low. The strength of the membranes is also increased. The butyrolactone is stable in the presence of the polyelectrolyte, especially an acidic polyelectrolyte such as polystyrene sulfonic acid.

Butyrolactone is a good solvent for both of the polymers employed in the production of the membranes, and it enables the use of higher concentrations of the polymers. Disadvantages encountered in employing a mixture of two dissimilar solvents are overcome. The volatility of butyrolactone is also relatively low, enabling the use of heat for producing the solution of the polymers, and the viscosity of the solution is favorable. These charatceristics are especially significant in the commercial production of the membranes.

The invention thus provides an improvement in a method of producing an ion selective permeable membrane of a homogeneous molecular dispersion of a water-insoluble, acid and alkali-resistant thermoplastic film-forming polymer and a linear polyelectrolyte, which comprises providing a butyrolactone solution of the polymers, and forming a film of the polymers therefrom. A new composition is also provided, of a butyrolactone solution of the polymers.

The ion exchange membranes produced according to the invention are either cation exchange or electronegative membranes, or anion exchange or electropositive membranes. They constitute finely porous film of homogeneous molecular dispersions of film-forming polymers and polyelectrolytes. The walls of the pores of the membranes carry dissociable groups. The groups may be acidic, such as sulfonic, phosphoric or carboxylic groups, in the case of the cation exchange or electronegative membranes, or basic, such as onium groups, e.g., quaternary ammonium groups, in the case of the anion exchange or electropositive membranes. The dissociable groups are an integral part of the membrane structure. The cation exchange membranes adsorb cations thereon, or exchange cations for those originally present on the membranes. These membranes also pass cations therethrough to the exclusion of anions, that is, they are permselective, when appropriate ion concentrations are maintained on the opposite sides of the membrane. The anion exchange membranes function in like manner, exchanging anions on the membrane.

The membranes are preferably cast intimate mixtures of the film-forming polymer and the polyelectrolyte, being cast from a solution thereof and thus producing a homogeneous molecular dispersion of the materials, which is distinct from the type of mixture obtained when a solid substance is dispersed in another material. The cast film is preferably treated with a polar liquid after formation of the film. The polyelectrolyte has a minimum average molecular weight of about 5000.

In a preferred form, the membrane is an intimate mixture of a water-insoluble substantially linear polyvinyl-type thermoplastic film-forming resin and a water-soluble linear polyvinyl type polyelectrolyte, in the form of a thin, finely porous film. The polymers are at most insubstantially cross-linked, and contain not exceeding two percent, if any, cross-linking agent, by weight of the polymer. The amount of permissible cross-linking varies with the polymer. The ability to form a film, in particular, from an organic solvent solution of the polymers, is a necessary characteristic in the invention. The infusible, insoluble substances which are for the most part brittle and tend to crack upon drying are not suitable for use in the invention.

The polyvinyl-type polymers are those derived by the additional polymerization of at least one monoolefinic compound through the unsaturated aliphatic group. They are preferably addition polymers of the unsymmetrically substituted ethylene class, comprising polymers obtained by polymerization or copolymerization of monomers containing a

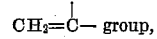
$CH_2=C-$ group, such as vinyl halides, vinylidene halides, vinyl esters, styrenes and acrylics.

The plastic film-forming materials used in the present invention may be of several types both as regards their chemical structure and their physical properties. The plastic film-forming material should be capable of being cast into a thin homogeneous film from an organic solvent casting solution. This film should be chemically stable, resistant to acids and alkalies, and water insoluble, in order to provide ultimately a satisfactory composite membrane film. The film-forming material must also be compatible when dissolved or dispersed in a casting solution with the polyelectrolyte which is incorporated therewith at the time the membrane is cast.

The most useful type of film-forming plastic materials are those derived from the copolymerization of vinyl chloride and acrylonitrile. These polymers may range from between 45% and 80% by weight of vinyl chloride, preferably, between 60% and 80% vinyl chloride, the balance being acrylonitrile. Their specific viscosities at 20° C. are preferably from 0.2 to 0.6 (0.1 gram in 50 cc. acetonyl acetone). Such polymers are described in U.S. Patent No. 2,420,565. A typical polymer of this type is a commercial material sold under the trade name Dynel. This material contains a major portion of vinyl chloride and a minor portion of acrylonitrile and varies somewhat in its constituents from batch to batch as manufactured. The material as supplied in its filament or fiber form has a specific gravity of 1.31 at 81° F., a tenacity wet or dry of 2.5–3.5 grams per denier and a 42% to 40% elongation wet or dry. The material is soluble in acetone, cyclohexanone and dimethylformamide. It has a strain release beginning at 240° F. and a softening range between 300° to 325° F.

Polymers containing vinylidene chloride and vinyl chloride in a percent by weight of about 90% to 10% and copolymers of vinylidene chloride and acrylonitrile are also useful. Another type of useful polymer is the copolymers produced by the copolymerization of polyvinyl alcohol and butyraldehyde. This latter copolymerization produces polyacetals whose film-forming properties, when reacted under the proper conditions, are similar to those indicated for the vinyl chloride-acrylonitrile polymers. The above polymers are all copolymers but homopolymers produced by the polymerization of acrylonitrile, vinyl chloride and vinylidene chloride are also contemplated.

The above listed polymers are only indicative of the general class of polymers that may be employed. The type of polymer that is useful is necessarily limited to its water insolubility, chemical stability, and acid and alkali resistance. It is also limited by its solubility characteristics in organic solvents and its compatibility with the polyelectrolyte with which it is incorporated.

The preferred plastic film materials have a high degree of plastic flow and are generally clear to opaque in physical appearance. While they are water-insoluble, they have the ability to take up a quantity of water or polar organic solvent. This characteristic is important in the production and use of the membranes.

The preferred polyelectrolytes which impart ionic, and thus electrophilic, properties to the thin plastic films are generally water-soluble, although this property is not necessary for the purpose of the invention. A preferred feature is the provision of the same type of basic polymer structure in both the film-forming material and polyelectrolyte, that resulting from the polymerization of vinyl-type monomers. The respective polymers are thus characterized by a high degree of compatibility which results in the formation of a uniform homogeneous membrane.

The functional groups of the electronegative polyelectrolyte may be of several types. For example, the functional or side chain groups of these polymers may be carboxylic, phosphonous, phosphonic and sulfonic. The preferred type polymer is that derived by the sulfonation of linear polystyrene. These materials preferably contain about one monosulfonic group per aromatic nucleus.

The electronegative polyelectrolytes that give most satisfactory results when employed in this invention are primarily homopolymers derived from the polymerization of one olefinic compound. For example, polystyrene sulfonic acid which is derived from the polymerization of styrene gives superior results. In a similar fashion polyacrylic acid gives good results, although the ionization of the carboxylic acid groups is not as strong as the ionization of the sulfonic acid groups.

Numerous useful anionic polymers are described in U.S. Patent 2,625,529, which describes synthetic water-soluble polyelectrolytes having a structure derived by the polymerization of at least one monoolefinic compound through the aliphatic unsaturated group, the structure being substantially free of cross-linking.

Of the electropositive polyelectrolytes, the preferred polymers have as their functional group a quaternary ammonium nitrogen atom. This nitrogen atom is preferably attached to the polymer by being associated or linked with an aromatic nucleus which is a side group in the linear chain. By the expression "associated with the aromatic nucleus" is meant to include nitrogen atoms which (a) are a part of the aromatic nucleus, e.g., poly N-methyl, 2-vinyl-pyridinium iodide and poly N-vinylimidazole methyl iodide; (b) are directly attached to the aromatic nucleus, e.g., polystyrene o- and p-trimethyl ammonium iodide; and (c) are attached to the aromatic nucleus by a divalent hydrocarbon radical, e.g., poly-(vinyl benzyl trimethyl or triethyl ammonium iodide).

In addition to polymers containing a nitrogen atom associated with an aromatic nucleus, quaternized poly-N-vinyl amines and the poly-N-allyl amines may also be used. In the case of these latter compounds, care must be used in preparing the quaternary derivatives so that little, if any, cross-linking occurs.

Other polyamines of the type described above may be used, wherein the functional nitrogen atoms are in the form of primary, secondary, or tertiary amino groups converted to the salt form. Additional useful polyamines are those described in the above referred to U.S. Patent No. 2,625,529, particularly columns 5 and 7.

The polyelectrolytes that give most satisfactory results are primarily homopolymers derived from the polymerization of one olefinic compound. For example, a poly-(vinyl benzyl trialkyl ammonium salt) and a poly-N-vinyl imidazole alkyl salt give superior results.

In a preferred embodiment of the invention, poly(vinyl benzyl trimethyl ammonium halide) is used, prepared for example by the chloromethylation and subsequent amination with trimethylamine of polystyrene in known manner. The preferred halide is the iodide, and the invention includes a new and improved method for making it from the chloride.

The new method of producing the membranes involves providing a butyrolactone solution of the film-forming polymer and of the polyelectrolyte, and casting a film of the polymers therefrom. The polymer content of the solution may be any amount up to about 30% by weight of the solution, above which value the viscosity becomes excessive. The higher concentrations are preferred for commercial production, and the ability to provide a concentrated solution is very advantageous for producing the desired relatively thick membranes. For high production rates, 10–30% concentrations are required, and the preferred concentration is on the order of 20%. The higher viscosity thus produced also prevents spreading of the wet film on the casting surface and the formation of bare spots.

The proportion of the polyelectrolyte in the mixture of polymers is at least 10%, preferably up to 30%, and at times as high as 60% by weight of the polymer mixture. The proportion of the film-forming polymer is thus about 40–90%, preferably 70–90% by weight. Especially valuable membranes are produced with a minor proportion of between 15% and 30% by weight of polyelectrolyte contained therein. The casting solution preferably contains about 9–15% of the film-forming polymer and about 1–15% of the polyelectrolyte, by weight of the solution.

In the preferred practice, the polymers are dissolved in gamma-butyrolactone. In the large-scale production of the membranes, small gel particles were observed in the membranes. It was discovered that the film-forming polymer formed these particles, and that they could be eliminated by separately dissolving and then filtering the polymer. Preferably, vigorous agitation and increased temperature of at least about 150° to about 300° F. are employed for dissolving the polymer, prior to filtration. The polyelectrolyte is dissolved separately in the lactone, and the two solutions are mixed for casting. Preferably, the solutions are mixed at a temperature of not greater than 180° F., filtered, and deaerated just prior to casting the membranes.

The solution of polymers is provided in a thin layer by any suitable mechanical means, and the solvent is removed by evaporation, to produce the membrane in the form of a finely porous film. The solvent may be removed under drying conditions at any temperature up to about 400° F., the drying time varying with the temperature. The drying time will also vary with the thickness of the layer and of the membrane film being formed. The preferred range for drying the film is about 200° to 350° F., and the time may vary from several minutes to a number of hours.

It has been found that to produce functional membranes, the solvent content of the film should be reduced to at least about 30% by weight of the film, on a dry basis, preferably to at least 20%. The lowest resistance and the highest permselectivity is obtained by substantially completely removing the solvent from the film. However, such drying requires relatively long drying time, and it is generally satisfactory to reduce the solvent content to the above values, preferably to about 5–15% in commercial operation. This may be achieved on commercial film-forming equipment by drying on the order of one-half hour at a temperature of about 250–270° F., for example. These conditions have reference to the production of films which have a dry film thickness of about 1–5 mils.

The membranes are at least 0.0001 inch in thickness, and they are preferably from 0.001 to 0.006 inch thick, measured in the water-hydrated form. It is an important advantage of the invention that films about 3–6 mils in thickness may readily be produced, as the mechanical properties of such films are especially useful in various applications. Thicker films may be produced, for example, up to about 25 mils. The thicker films may be formed by building up several films with intermediate drying, or a single thick film may be cast and dried for an extended period of time, at 200° F., for example.

The membranes may be cast on a number of different supports, such as glass or metal plates, for example, the polished chromium-plated drum or a stainless steel belt or plate. The new composition may also be sprayed or cast upon preferably porous surfaces which act as bases, supports or frameworks to strengthen the films.

After removing solvent from the cast layer, it is contacted with a polar liquid. It has been found that low resistance membranes are produced by contacting first with methanol or ethanol. The membranes may also be contacted with water, preferably deionized water, but, depending upon the composition of the membrane, the resistance may be relatively high. The resistance is preferably about 100 ohms per square centimeter or below, and for certain applications, 30 ohms or less. The resistance is measured in 0.15 normal KCl. The polar liquid will also loosen the membrane, so that it may be removed from a smooth support upon which it is cast.

In the production of preferred membranes according to the invention, it has been found that the electronegative membrane produced with polystyrene sulfonic acid is preferably first contacted with ethanol. The electropositive membrane produced with poly(vinyl benzyl trialkyl ammonium halide) is preferably first contacted with methanol. The contact time may vary widely, depending upon the composition of the membrane, the drying conditions, and its thickness. Thus, a period of time ranging from about thirty minutes to eighteen or more hours may be required, and this may readily be determined by determining the properties of the membrane which result from several treatment times.

The membranes are next contacted with water, preferably deionized water. The time may likewise vary, from about ten minutes to several hours.

The foregoing method of producing the membranes is illustrated in the attached drawing, which is a flow sheet showing the method steps in sequence.

In this manner, membranes suitable for various applications are produced. The mechanism of the formation of suitable membranes in this manner is not entirely understood. While the invention is not limited to any theory, it appears that the alcohol treatment swells the membrane and also removes butyrolactone therefrom. Subsequent contacting with water apparently acts to hydrate the membrane and also removes the alcohol. The membrane is then ready for use, preferably equilibrating it in the type of solution with which it is to be used. In this manner, membranes having high permselectivities, which may approach the theoretical, and low resistances, below 10 ohms per square centimeter where desired, are produced.

The following examples are illustrative of the methods and compositions of the invention, but it will be understood that the invention is not limited to the particular components, proportions, conditions and procedures described therein. Unless otherwise specified, the proportions are by weight.

*Example 1*

In the production of the ion exchange membranes, it is generally preferred to dissolve the film-forming polymer and the polyelectrolyte in separate portions of the butyrolactone, and then mix the solutions.

Dynel is dissolved in gamma-butyrolactone, in the proportion of 1 part by weight of Dynel to 4 parts of the lactone, at 200° F. with vigorous agitation. The solution is filtered to remove any polymer gel particles.

Polystyrene sulfonic acid, 1 part is dissolved in 4 parts of gamma-butyrolactone at 100° F., with agitation.

In manufacturing the membranes, 23 parts of the polystyrene sulfonic acid solution are mixed with 77 parts of the Dynel solution, heated to 160° F., filtered, and vacuum deaerated.

The solution is then ready for casting. It may be cast on a glass or metal plate. For producing large quantities of the membranes, it is preferably deposited in a layer, by passing through an elongated slot onto a rotating drum or revolving belt. The layer is then dried and removed by soaking with a polar solvent or peeling the film from the casting surface.

The above casting solution contains 4.6% of polystyrene sulfonic acid, 15.4% of Dynel, and 80% of gamma-butyrolactone. The resulting membrane contains 23% of the polyelectrolyte and the balance Dynel, on a completely dry basis. Cation permeable membranes having other compositions are prepared in like manner.

*Example 2*

Anion permeable membranes are prepared in like manner to Example 1, which contain, for example, 27.5% of poly(vinyl benzyl trimethyl ammonium iodide) and the balance Dynel, on a dry basis.

The same Dynel solution as in Example 1 may be employed. The polyelectrolyte solution is produced by dissolving 1 part of the electrolyte in 4 parts of gamma-butyrolactone, and heating to 120° F. with agitation.

In production of the membranes, 27.5 parts of the electrolyte solution are mixed with 72.5 parts of the Dynel solution, heated, filtered, and vacuum deaerated as in Example 1. The casting solution contains 5.5% of the polyelectrolyte, 14.5% of Dynel, and 80% of gamma-butyrolactone.

The membranes are then produced in the same manner, pouring a layer of sufficient thickness to produce the membrane thickness desired, or employing a doctor blade suitably adjusted for the desired thickness.

*Example 3*

Cation permeable, or electronegative, membranes were prepared as described in Example 1.

Membranes containing 20% polystyrene sulfonic acid and 80% Dynel were cast from a solution of 4% polystyrene sulfonic acid, 16% Dynel, and 80% gamma-butyrolactone. The membranes were dried from 20 to 40 minutes at 265° F. reducing the solvent to 15.7% to 8.2%, as the drying time increased. After leaching or contacting for thirty minues in methanol followed by ten minutes in deionized water, membrances were produced having resistances of 35 to 53 ohms per square centimeter in 0.15 normal KCl. The thickness of the hydrated films were 2.8 to 2.5 mils. The resistances of the membranes when leached for forty-two hours in methanol followed by seventy-five minutes in deionized water were not substantially different. The permselectivities were good.

Sections cut from the above membranes were dried at 220° F. for eighteen hours to substantially completely remove the solvent and were leached eighteen hours in methanol followed by one hour in deionized water. The resistances were reduced to 25 to 31 ohms per square centimeter and permselectivities were also proportionally improved.

Membranes were cast from solutions containing from 4% to 5% polystyrene sulfonic acid, from 16 to 15% Dynel, and 80% gamma-butyrolactone, and were dried at 260° F. for 20–30 minutes. They contained about 10–16% of lactone remaining in the membrane, based on the dry weight of the membrane. The resistances varied from 35 to 7 ohms per square centimeter when leached 40 minutes in methanol followed by 18 hours in deionized water, and they were 3.1 to 3.9 mils thick.

Membranes prepared from casting solutions containing 8% polystyrene sulfonic acid, 12% Dynel, and 80% gamma-butyrolactone, dried at 260° F. about 18 to 30 minutes, were leached 18 hours in methanol and 90 minutes in deionized water, to produce films 1.7–1.8 mils thick. The resistances varied from 4.8 to 5.4 ohms per square centimeter.

The molecular weight of the polystyrene sulfonic acid employed in this example was about 140,000 (prepared from polystyrene having a molecular weight of 70,000).

*Example 4*

Anion permeable, electropositive membranes were prepared as described in Example 2.

Membranes containing 20% of poly (N-vinyl imidazole methyl iodide) were prepared by casting on a stainless steel casting plate a solution containing 4% of the polyelectrolyte, 16% of Dynel and 80% of gamma-butyrolactone. Drying at 30 and 45 minutes at 260° F. produced films which were 5.4 and 4.0 mils thick and had resistances of 33 and 40 ohms per square centimeter, respectively, when contacted with methanol for 18 hours followed by deionized water for 2 hours. The permselectivities were good.

Membranes were cast from the foregoing solution and dried at 300° F. for 30 and 45 minutes. When contacted with methanol followed by deionized water, the resistances were 53 and 23 ohms per square centimeter, the thickness of the films were 3.4 and 3.0 mils, respectively, and the permselectivities were good. On the other hand, when the membranes were first contacted with deionized water, instead of methanol, the resistances were undesirably high.

Membranes containing 30% of the above polyelectrolyte were cast from solutions containing 6% of the electrolyte, 14% of Dynel, and 80% of the lactone. When dried at 260° F. for 30 to 45 minutes, followed by leaching with methanol and then contacting with deionized water, the resistances of the membranes ranged from 7 to 15 ohms per square centimeter, and the permselectivities were good.

*Example 5*

Anion permeable membranes were prepared from poly (vinyl benzyl trimethyl ammonium iodide) and Dynel. Membranes containing 20% of the polyelectrolyte were cast on stainless steel casting plates from a solution of 4% of the electrolyte, 16% Dynel, and 80% gamma-butyrolactone. They were dried at 225° F. for 60 and 120 minutes. After leaching or contacting for 18 hours with methanol, followed by contacting for 2 hours with deionized water, the resistances were 22 and 42 ohms per square centimeter in 0.15 normal KCl, and the permselectivities were good. The film thicknesses were 4.1 and 3.8 mils.

Membranes ranging in thickness from 1.9 to 4.4 mils were produced in the same manner, drying for 30 minutes at 260° F. The molecular weight of the polyelectrolyte was about 60,000 or 90,000 (prepared from polystyrene having molecular weights of 20,000 and 30,000). The resistances of the films ranged from 23 to 35 ohms per square centimeter, and the permselectivities were good.

Membranes containing 25% of the polyelectrolyte, having molecular weights of about 60,000 and 90,000 were prepared from a solution containing 5% of the electrolyte, 15% Dynel, and 80% of the lactone. The membranes were dried for 30 minutes at 260° F. After leaching for 18 hours with methanol, followed by contacting for 2 hours with deionized water, the resistances were both 24 ohms per square centimeter, and the permselectivities were good. The thicknesses of the film were 3.4 and 4.0 mils. When the membranes were first leached with deionized water instead of methanol, the resistances were 225 and 275 ohms per square centimeter.

Membranes containing 27.5% of the polyelectrolyte were cast from a solution of 5.5% electrolyte, 14.5% Dynel, and 80% of the lactone. The membranes were dried at from 260° F. to 300° F., from 20 to 40 minutes. When the films were contacted with methanol for 18 hours followed by deionized water for 2 hours, the resistances ranged from 11 to 23 ohms per square centimeter, the thicknesses were 2.5 to 4.8 mils, and the permselectivities were good.

Membranes may likewise be prepared from poly (vinyl benzyl triethyl ammonium chloride), and from poly (vinyl benzyl trimethyl ammonium acetate). The permselectivities of the membranes made from the latter polyelectrolyte are slightly reduced.

In producing the membrane, it is necessary to select the form of the quaternary amine which is soluble in butyrolactone. Thus, poly (vinyl benzyl trimethyl ammonium chloride) is not sufficiently soluble in butyrolactone, whereas the iodide is. On the other hand, the chloride of the triethyl quaternary amine is soluble.

It is generally preferred that the molecular weight of the above polyelectrolytes be from about 5,000 to about 200,000.

*Example 6*

Cation permeable membranes containing 23% of polystyrene sulfonic acid were prepared by casting a solution containing 4.6% of the electrolyte, 15.4% Dynel, and 80% gamma-butyrolactone on stainless steel casting plates. The layers were dried at 260° F. for 21 and 30 minutes, to produce films containing 15.3 and 11.3% of solvent in the membrane, respectively. When contacted for 40 minutes in methanol followed by 18 hours in deionized water, the resistances were 16 and 15 ohms. The thicknesses were 3.2 and 3.3 mils. 18 hours in methanol followed by 60 minutes in deionized water produced resistances of 25 and 19 ohms per square centimeter.

When these membranes were dried at 221° F. for 18 hours to eliminate substantially all of the solvent, the resistances were 500 to 350 ohms when contacted one hour in methanol and 2 hours in deionized water. When contacted 18 hours in methanol and one hour in deionized water, the resistances were 13 and 15 ohms per square centimeter.

Cation permeable membranes may likewise be prepared by substituting for the Dynel, polyvinylchloride, polyvinylidene chloride, and polyacrylonitrile.

*Example 7*

Cation permeable membranes containing 25% of polystyrene sulfonic acid having molecular weights ranging from 20,000 to 140,000 (prepared from polystyrene having molecular weights of 10,000 to 70,000) were prepared at different drying temperatures and times. The membranes were cast from solutions containing 5% polystyrene sulfonic acid, 15% Dynel, and 80% gamma-butyrolactone.

When the membranes were dried at 210° F. from 20 to 45 minutes, films were produced which had resistances ranging from 15 to 40 ohms per square centimeter, when contacted with methanol for 18 hours followed by deionized water for 2 hours. The films ranged from 2.1 to 3.1 mils thick. When contacted first with deionized water, the resistances were generally high.

Drying for 10 to 30 minutes at 265° F. produced membranes having resistances from 7 to 42 ohms, after contacting with methanol followed by deionized water. When dried at 300° F. for 10 to 30 minutes, the membranes had resistances of 10 to 26 ohms, when contacted with methanol followed by deionized water. The thicknesses of the hydrated membranes dried at 265° F. and 300° F. ranged from 1.8 to 3.5 mils. The permselectivities of the various membranes were good.

It is generally preferred that the molecular weight of the polystyrene sulfonic acid be about 50,000–140,000 for low resistances. The resistances of such membrances are better, for example, than from 20,000 molecular weight.

*Example 8*

In the preferred method of producing an anion permeable membrane, poly (vinyl benzyl trimethyl ammonium iodide) is employed as the polyelectrolyte. Since this polymer is most conveniently produced in the chloride form, it is necessary to convert to the iodide form. In the invention, a unique and very advantageous method for producing the iodide from the chloride has been found.

The chloride form of the polyelectrolyte is dissolved in methanol at about 20% concentration. The solution is then passed through a strongly basic anion exchange resin in the hydroxide form. This converts the polyelectrolyte to the hydroxide, and a solution of the hydroxide is obtained.

Any strongly basic anion exchange resin in finely divided solid form may be employed. For example, the ion exchange resin may be produced from a copolymer of about 2–4% divinyl benzene and the balance styrene. The copolymer is chloromethylated and thereafter reacted with aqueous trimethylamine in known manner, to produce a strongly basic quaternary ammonium anion exchange resin in the chloride form. The resin may be converted to the hydroxide form by treating with sodium hydroxide solution, to exchange the chloride ions for hydroxyl ions.

The methanol solution of the polyelectrolyte in the hydroxide form, as produced by contacting with the anion exchange resin is diluted with isopropanol and is then precipitated with hydroiodic acid in at least the stoichiometric amount required to convert the polyelectrolyte to the iodide, preferably employing a slight excess of the acid. The mixture is preferably 25% to 50% methanol and the balance isopropanol. Precipitate of the polyelectrolyte in the iodide form is then separated, washed with isopropanol, and dried.

The preferred cation permeable membrane contains about 23% of polystyrene sulfonic acid and about 77% Dynel, and it is preferably formed from a solution of 20% of the polymers and 80% of gamma-butyrolactone. The preferred anion permeable membrane contains 27.5% of poly (vinyl benzyl trimethyl ammonium iodide), and 72.5% Dynel. It is likewise cast from a solution containing 20% of the polymers and 80% of gamma-butyrolactone.

The invention thus provides a new and improved method of producing cation and anion permeable membranes, which is especially suited for large-scale production. The method and the new composition provide a number of advantages of substantial importance, particularly, good mechanical strength, good electrochemical properties, and improvements in the manufacture of the membranes. The tensile strength of the membranes is greater than the single solvents previously proposed, dimethylformamide and dimethylsulfoxide, and the electrochemical properties are improved. Higher production rates are achieved, by the provision of the concentrated solutions and due to the high drying temperatures which may be employed.

The invention is hereby claimed as follows:

1. In a method of producing an ion selective permeable membrane of a homogeneous molecular dispersion of a water-insoluble, acid and alkali-resistant thermoplastic film-forming polymer and a linear polyelectrolyte, the improvement which comprises providing a butyrolactone solution of said polymers, and forming a film of the polymers therefrom.

2. The method defined in claim 1 wherein the proportion of said polyelectrolyte is at least 10% by weight of said polymers.

3. In a method of producing an ion selective permeable membrane of a homogeneous molecular dispersion of a water-insoluble, acid and alkali-resistant thermoplastic film-forming polymer and a linear polyelectrolyte, the improvement which comprises providing a butyrolactone solution containing up to about 30% by weight of said polymers, forming said solution in a thin layer, and removing solvent from the layer by evaporation, to produce the membrane in the form of a finely porous film.

4. The method defined in claim 3 wherein the solvent content of the film is reduced to below about 30% by weight of the film on a dry basis.

5. In a method of producing an ion selective permeable membrane of a homogeneous molecular dispersion of a water-insoluble, acid and alkali-resistant thermoplastic film-forming polymer and a linear polyelectrolyte, the improvement which comprises providing a butyrolactone solution of said polymers, forming said solution in a thin layer, removing solvent from the layer by evaporation, contacting the layer with a member selected from the group consisting of methanol and ethanol, and contacting the layer with water.

6. The method defined in claim 5 wherein said solvent is removed from the layer to reduce the solvent content to below about 30% by weight of the layer on a dry basis.

7. The method defined in claim 1 wherein said film-forming polymer and said polyelectrolyte are addition polymers of at least one monoolefinic compound containing a $$CH_2=\overset{|}{C}-$$

group.

8. The method defined in claim 7 wherein said film-forming polymer is a copolymer of vinyl chloride and acrylonitrile, and said polyelectrolyte is polystyrene sulfonic acid.

9. The method defined in claim 7 wherein said film-forming polymer is a copolymer of vinyl chloride and acrylonitrile, and said polyelectrolyte is a poly-quaternary amine salt.

10. The method defined in claim 7 wherein said film-forming polymer is a copolymer of vinyl chloride and acrylonitrile, and said polyelectrolyte is a poly-(vinyl benzyl trialkyl quaternary amine salt).

11. The method defined in claim 7 wherein said film-forming polymer is a copolymer of vinyl chloride and acrylonitrile, and said polyelectrolyte is a poly-(N-vinyl imidazole alkyl quaternary amine salt).

12. The method defined in claim 10 wherein said polyelectrolyte is employed in the form of the iodide salt.

13. The method of producing an electronegative selective permeable membrane which comprises providing a gamma-butyrolactone solution of about 70–90% by weight of a film-forming vinyl chloride-acrylonitrile copolymer and about 30–10% by weight of polystyrene sulfonic acid, forming said solution in a thin layer, removing solvent from the layer by evaporation, contacting the layer with ethanol, and contacting the layer with water.

14. The method of producing an electropositive selective permeable membrane which comprises providing a gamma-butyrolactone solution of about 70–90% by weight of a film-forming vinyl chloride-acrylonitrile copolymer and about 30–10% by weight of a poly-(vinyl benzyl trialkyl ammonium halide), forming said solution in a thin layer, removing solvent from the layer by evaporation, contacting the layer with methanol, and contacting the layer with water.

15. A composition for casting an article having ion exchange properties comprising a butyrolactone solution of a water-insoluble, acid and alkali-resistant thermoplastic film-forming polymer and a linear polyelectrolyte.

16. The composition defined in claim 15 wherein the proportion of said polyelectrolyte is at least 10% by weight of said polymers.

17. The composition defined in claim 15 wherein said solution contains up to about 30% by weight of said polymers present in a weight ratio of about 70–90% of a film-forming vinyl chloride-acrylonitrile copolymer and about 30–10% of a linear polyelectrolyte.

18. A composition for casting an article having ion exchange properties comprising a gamma-butyrolactone solution of film-forming vinyl chloride-acrylonitrile copolymer and a poly-quaternary amine salt.

19. The composition defined in claim 18 wherein said solution contains up to about 30% by weight of said polymers present in a weight ratio of about 70–90% of a film-forming vinyl chloride-acrylonitrile copolymer and about 30–10% of a poly-quarternary amine salt.

20. A composition for casting an article having ion exchange properties comprising a gamma-butyrolactone solution of a film-forming vinyl chloride-acrylonitrile copolymer and a poly-(vinyl benzyl trialkyl quaternary amine salt).

21. The composition defined in claim 17 wherein said solution contains up to about 30% by weight of said polymers present in a weight ratio of about 70–90% of a film-forming vinyl chloride-acrylonitrile copolymer and about 30–10% of a poly-(vinyl benzyl trialkyl quaternary amine salt).

22. A composition for casting an article having ion exchange properties comprising a gamma-butyrolactone solution of a film-forming vinyl chloride-acrylonitrile copolymer and polystyrene sulfonic acid.

23. The composition defined in claim 22 wherein said solution contains up to about 30% by weight of said polymers present in a weight ratio of about 70–90% of a film-forming vinyl chloride-acrylonitrile copolymer and about 30–10% of polystyrene sulfonic acid.

References Cited in the file of this patent

UNITED STATES PATENTS

| | | |
|---|---|---|
| 2,141,169 | Catlin | Dec. 27, 1938 |
| 2,631,989 | Padbury | Mar. 17, 1953 |
| 2,632,748 | Caldwell | Mar. 24, 1953 |
| 2,695,427 | Sarge et al. | Nov. 30, 1954 |
| 2,702,795 | Gilwood | Feb. 22, 1955 |
| 2,710,426 | Platzer et al. | June 14, 1955 |
| 2,723,245 | Wheaton | Nov. 8, 1955 |
| 2,730,768 | Clarke | Jan. 17, 1956 |
| 2,769,792 | Ham | Nov. 6, 1956 |
| 2,780,604 | Clarke et al. | Feb. 5, 1957 |